United States Patent

[11] 3,607,784

| [72] | Inventor | Adolf Mlot-Fijalkowski<br>Elmwood Park, Ill. |
|---|---|---|
| [21] | Appl. No. | 800,097 |
| [22] | Filed | Feb. 18, 1969 |
| [45] | Patented | Sept. 21, 1971 |
| [73] | Assignee | Magnaflux Corporation<br>Chicago, Ill. |

[54] METHOD OF REMOVING EXCESS PENETRANT FROM THE SURFACE OF A WORKPIECE
19 Claims, 2 Drawing Figs.

[52] U.S. Cl..................................................... 252/408,
73/105, 73/67.5, 250/71 R, 252/301.2 R
[51] Int. Cl....................................................... C09k 1/02,
G01n 21/16, G01n 21/38
[50] Field of Search........................................... 252/408,
301.2, 153, 170; 250/71; 73/105, 67.5

[56] References Cited
UNITED STATES PATENTS
3,349,041 10/1967 Alburger..................... 250/71

3,418,078 12/1968 Mlot-Fijalkowski.......... 250/71
3,429,826 2/1969 Alburger..................... 252/301.2

*Primary Examiner*—John T. Goolkasian
*Assistant Examiner*—M. E. McCamish
*Attorney*—Hill, Sherman, Meroni, Gross & Simpson ABSTRACT: A liquid remover composition for the removal of a film of excess liquid penetrant from the surface of a workpiece undergoing inspection for surface discontinuities. The remover composition is a two-phase liquid in which the continuous phase is water and dispersed phase is a liquid immiscible with water but miscible with the liquid penetrant, and is present in an amount from about 0.2 percent to 10 percent by weight, or higher, of the remover composition. The dispersed phase is in very finely divided form suspended in the water when applied with vigorous turbulence against the film of excess penetrant to be removed. Preferably, the dispersed phase liquid is of a substantially different density from water so that separation can be easily effected, after removal of the penetrant from the surface, between the water and the admixed penetrant and dispersed phase liquid so as to facilitate separate use or disposal thereof without pollution problems.

PATENTED SEP 21 1971 3,607,784
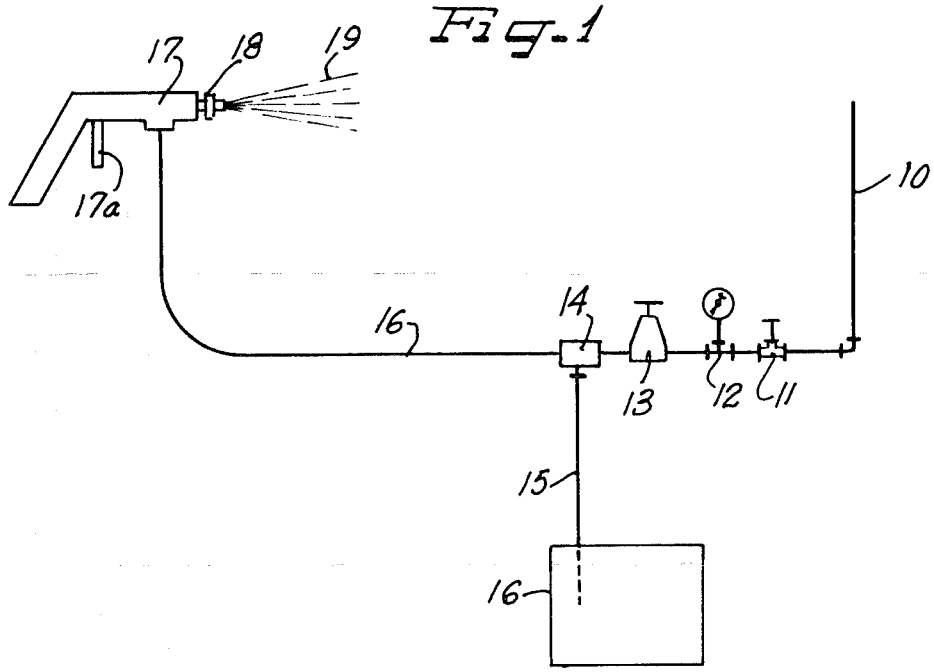
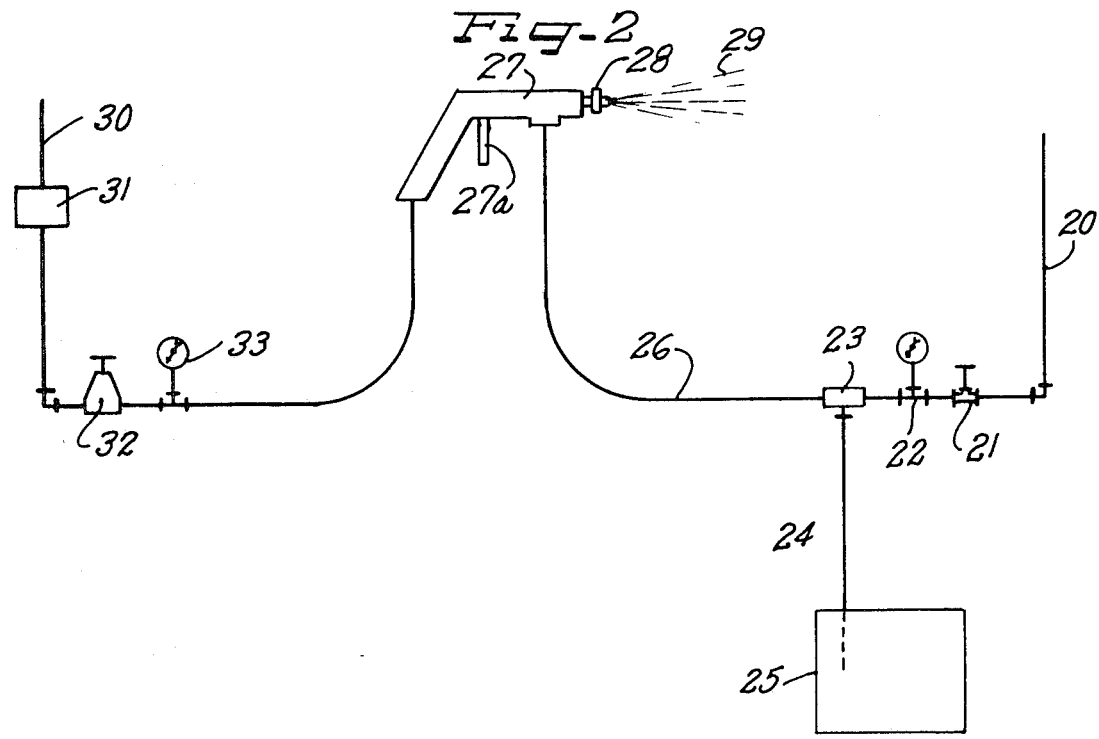
INVENTOR.
Adolf Mlot-Fijalkowski
BY Hill, Sherman, Meroni, Gross & Simpson
ATTORNEYS

METHOD OF REMOVING EXCESS PENETRANT FROM THE SURFACE OF A WORKPIECE

SUMMARY OF THE INVENTION

This invention particularly relates to an improvement in the penetrant method for inspecting workpieces for flaws and other surface discontinuities that includes the application to such surface of a liquid penetrant of the oily-type. The term "workpiece" is used generally to designate any article or structure to be inspected by the penetrant method, and the expression "oily-type" refers to penetrants having a liquid vehicle that is immiscible with water and is neither self-emulsifying nor contains an added emulsifier to render it water washable. Usually the penetrant contains a visible or fluorescent dye to give a color indication at the locus of any surface discontinuity that is rendered visible upon inspection under white or block light, but my method is not limited to the use of a dyed penetrant.

The liquid remover composition of my invention is a two-phase liquid in which the continuous phase is essentially water and the dispersed phase is a hydrophobic water-immiscible liquid that is miscible with the liquid penetrant and that, preferably, is of substantially different density and/or volatility from the density and/or volatility of water so as to facilitate subsequent separation of the contaminated water phase from the admixture of spent penetrant and of the dispersed phase liquid that is formed in the step of removing excess penetrant from the surface undergoing inspection. The dispersed phase liquid has a solubility in water of not over 0.1 percent by weight and is therefore termed herein to be hydrophobic or water-immiscible.

For the purposes of my invention any liquid, which is liquid at normal temperatures, which is hydrophobic and which is miscible with the liquid vehicle of the penetrant employed, can be used satisfactorily to remove penetrant from the surface of the workpiece. Bearing in mind inexpensiveness and market availability, liquid hydrocarbons, especially aliphatic hydrocarbons and chlorinated liquid aliphatic hydrocarbons where nonflammability is a factor and relatively high volatility is desired, are preferred for use as the dispersed phase liquid but other hydrophobic, normally liquid penetrant solvents can be used, including liquid esters of phosphoric acid, such as tributyl phosphate; liquid plasticizers, such as the phthalates, adipates and stearates; liquid, water-insoluble alcohols, such as hexadecyl and other long chain ($C_{13}$-$C_{16}$) alcohols; nonbenzenoid liquid hydrocarbons, such as the terpenes, alpha terpineol and the like; vegetable oils, such as castor and other bean or seed oils; and animal oils, such as whale oil, can be used. In the case of the less volatile oils, an oil film may be left on the surface of the workpiece but this may be unobjectionable or may even be desirable as a rust preventive coating. In general, any compatible mixture of two or more of the foregoing oil-miscible, hydrophobic liquids can be used as the dispersed phase liquid.

The preferred liquid hydrocarbon is kerosene, or other petroleum distillate that is relatively more volatile than water and that therefore evaporates off first to leave only water on the surface at the end of the penetrant-removal step prior to drying the workpiece. Post water-washing is thereby eliminated.

In preparing the liquid remover composition, the dispersed phase liquid is preferably injected into a stream of water under controlled conditions as to rate of injection to give the desired proportion and fine droplet dispersement of the hydrophobic liquid into the water. A proportion of about 0.5—1 percent of the dispersed liquid phase by weight of the total composition is preferable on an expendable basis. Depending upon the manner of applying the liquid remover composition to the surface of the workpiece, the proportions may be varied, as for instance, between 0.2 percent and 2 percent for the spray injection manner of application for use on an expendable basis; between 2 percent and about 5 percent for a mechanically agitated mass of the remover composition for use on a recirculative basis; and between 5 percent and 10 percent, or even higher, for a dip method of application.

Where the proportion is from 0.2 percent to about 2 percent, the tolerance of the remover composition toward the penetrant is practically nil and the use of the remover is necessarily on an expendable basis, but when the proportion is between 2 percent and 5 percent, or as high as 10 percent, the use of the remover composition can be on a limited recirculative basis. The penetrant tolerance for a remover composition containing about 10 percent by weight of kerosene as the dispersed phase is approximately 1.5 percent by weight. After the penetrant tolerance limit of the remover-penetrant admixture is reached a fresh remover composition must be employed to avoid redepositing of penetrant on the surface of the workpiece during the penetrant removal step.

If a liquid is used as the dispersed phase that is lighter, e.g. of significantly lower density than that of water, the admixed liquid of the dispersed phase and the penetrant can be separated by centrifuging; or if collected and allowed to stand quiescent until stratification takes place, separation can be effected by decanting off the upper lighter layer. On the other hand, if the liquid of the dispersed phase is substantially denser than water, the mixture of that liquid and the penetrant will sink upon standing and the water layer can be decanted off. In any case separation can be effected and the spent liquid of the dispersed phase, contaminated with penetrant, can be disposed of separately in such manner as to avoid pollution of sewerage or streams, and the water in a practically uncontaminated state can be disposed of without fear of pollution, or can be processed for reuse. In those cases where a very volatile hydrocarbon or chlorinated hydrocarbon is used as the liquid of the dispersed phase, the contaminated liquid can be fractionally distilled to recover the hydrocarbon for reuse.

Among the advantages of my liquid remover composition and method are:

1 Relative inexpensiveness;
2 Absence of foaming during preparation and use, even with air agitation or air spraying;
3 Substantially complete absence of detrimental removal of penetrants from flaws or other surface discontinuities;
4 Practically no diffusion into penetrant entrapped or otherwise in the absence of vigorous turbulence at the interface, as by spraying, mechanical agitation or the like;
5 Ease of controllably removing excess surface penetrant without removal of entrapped penetrant; and
6 Increase in the brightness of color indications as a result of (4) and (5).

If there is a corrosion problem due to the high water content and the use of iron or steel vessels or equipment, corrosion inhibitors such as sodium nitrite, sodium chromate or mixtures thereof, or other conventional rust inhibitors, sequestering agents and the like can be incorporated into the water phase.

In the penetrant method to which my invention is directed, the liquid penetrant is first applied to the surface of the workpiece, as by spraying, brushing or dipping. Then, after an appropriate dwell time to permit penetration by the penetrant of any surface discontinuities, the penetrant may be partially removed from the surface by draining or wiping, without, however, removing penetrant from any surface discontinuities.

At this stage there still remains a surface film of penetrant which must be removed before development and/or inspection. It is at this stage that my liquid remover composition is applied directly against the film of excess surface penetrant, using any of the methods of application herein described.

BRIEF DESCRIPTION OF THE DRAWINGS

FIG. 1 is a schematic view of a system for use in the practice of the method of my invention wherein the remover composition is sprayed under hydraulic pressure through a spray gun; and FIG. 2 is a similar schematic view wherein air pressure supplied to the spray gun is effective in the spraying of the remover composition.

DETAILED DESCRIPTION OF THE INVENTION

In FIG. 1 of the drawings, the reference numeral 10 indicates a high-pressure water supply line; the reference numeral 11 indicates a globe valve; and the reference numeral 12 indicates a pressure gauge. A pressure regulator 13 in the downstream side of the line 10 serves to regulate the pressure of the water going into an injector 14, which may be of the usual or conventional design. From the injector 14 a pipe line 15 extends downwardly into a reservoir of the penetrant-solvent but water-immiscible liquid that is to be injected into the stream of water by means of the injector 14. From the injector 14, a flexible conduit 16 leads to the intake of a spray gun 17. Said spray gun is of the airless hydro-type and thus is operative under the pressure of the liquid in the flexible conduit 16, in conjunction with its spray nozzle 18, to discharge a spray 19 of the liquid remover composition. In FIG. 2, water is supplied under pressure through a pipe line 20, a valve 21 and a pressure gauge 22 into an injector 23. The tank 25, like the reservoir 16, contains a supply of the water immiscible but penetrant miscible liquid, that is drawn through a conduit 24 into the injector 23, where it is injected into and mixed with the water supplied to the injector through the line 20. From the injector 23, a flexible conduit 26 leads to a spray gun 27 having a nozzle 28, through which the liquid remover composition is discharged as a spray 29. In this case, the spray gun 27 is a hydrospray-type of gun, and is supplied with air under pressure from a supply line 30 having a filter 31 therein. From the filter 31, the filtered air passes through a continuation of the line 30 that includes a pressure regulator 32 and a pressure gauge 33, and thence into the gun 27. Since the guns 17 and 27 with their actuating triggers 17a and 27a, and the injectors 14 and 23 are of conventional or usual construction or design no further description of them is believed necessary. With either of the two types of gun, the liquid remover is discharged at a suitable pressure, as for instance from 10 to 30 p.s.i., or even higher, directly against the film of excess penetrant on the surface of the workpiece undergoing testing.

When operating either of the systems shown in FIGS. 1 and 2 the desired proportioning of the water-insoluble but penetrant-miscible liquid from tank 25 to the water introduced under pressure into the injector 14 or 23 can be made and maintained by proper adjustment of the injector, which is of the conventional proportionating type. As previously stated, a minimum proportion of about 0.2 percent of the dispersed liquid phase by weight of the total aqueous remover composition is preferable, although lower concentrations can be used if high spraying pressures or increased spraying times are employed. Due to the great variety of surface finishes that may be encountered in the use of the penetrant method of inspection no standard instructions are possible in connection with the use of my two-phase liquid remover composition, but, in general, smooth surfaces require a minimum of about 30 to 60 seconds spraying time at about 20 p.s.i. pressure depending upon the concentration of the dispersed liquid phase, while longer times of spraying and higher pressures may be required with rougher surfaces.

In the practice of my method, using any of the penetrant-miscible but water-immiscible liquids above named as the dispersed phase, and plain water as the continuous phase, the liquid remover is prepared by the use of either of the systems shown in FIGS. 1 and 2 to give a clear, relatively stable liquid remover within the proportions of the dispersed phase and the continuous phase previously set forth herein. The term "relatively stable" is used in a limited sense to indicate that the dispersed phase will not coalesce and separate out as a layer, either at the top or the bottom of a column of the liquid remover within a period of several hours of standing. Such relative stability is surprising in view of the fact that the dispersed phase and continuous phase are immiscible with one another and in view of the further fact that no surfactant, emulsifying agent, or coupler is included in the liquid remover composition. Neither does the penetrant that is removed by my method contain any added emulsifier or coupler, yet the turbulence produced by spraying my liquid remover directly against the film of penetrant on the surface of the workpiece effects a complete removal of the penetrant within a reasonable length of time of spraying. Due to the immiscibility of the liquid remover and the oily-type penetrant, the complete removal of the penetrant can be effected from the surface of the workpiece without any appreciable removal of penetrant that may be entrapped in surface discontinuities.

Liquids that are normally in the liquid state, that are insoluble in water and that are satisfactory for use as the dispersed-phase liquid of my liquid remover composition include:

| Solvents | Initial B. Pt. | Flash point TCC, °F. | Sp. gr. at 60° F. | Composition, percent volume | | |
|---|---|---|---|---|---|---|
| | | | | Paraffins | Naphthenes | Aromatics |
| Hydrocarbons: | | | | | | |
| Hexane | 338 | 130 | 0.806 | | | |
| Heptane | 151 | 0 | 0.680 | 80 | 20 | |
| Naphtha | 202 | 23 | 0.680 | 50 | 48 | 2 |
| VM and P naphtha | 207 | 24 | 0.773 | 38 | 52 | 10 |
| Paraffinic | 248 | 53 | 0.764 | 43 | 41.6 | 15 |
| | 348-373 | 125-144 | 0.76 | 93.5-100 | 6.3-0 | Balance |
| Chlorinated hydrocarbons: | | | | | | |
| Methylene chloride | 102 | None | 1.32 | | | |
| Carbon tetrachloride | 167 | None | 1.589 | | | |
| Trichlorethylene | 184 | None | 1.457 | | | |
| Ethylene dichloride | 181 | 70 | 1.247 | | | |
| Perchlorethylene | 249 | None | 1.618 | | | |
| Tetrachlorethylene | 274 | None | 1.593 | | | |

| | Boiling ranges at 4 mm., °C. | Flash point TCC, °F. | Sp. gr. at 20/20° C. |
|---|---|---|---|
| Phosphoric ester plasticizers: | | | |
| Tri(butoxyethyl) phosphate | 215-228 | 435 | 1.020 |
| Tri(2-ethylhexyl) phosphate | (216) | 420 | 0.926 |
| Tributyl phosphate | 137-145 | 380 | 0.978 |
| Tricresyl phosphate | 241-255 | 500 | 1.165 |
| Phthalate plasticizers: | | | |
| Di(2-ethylhexyl) phthalate | 222-230 | 420 | 0.986 |
| Diisooctyl phthalate | 228-237 | 425 | 0.986 |
| Dibutyl phthalate | 175-180 | 340 | 1.049 |
| Adipate and fatty acid plasticizers: | | | |
| Di(2-ethylhexyl) adipate | 208-218 | 381 | 0.927 |
| Diisooctyl adipate | 213-223 | 398 | 0.928 |
| Liquid alcohols: | | | |
| Of long $C_{12}$-$C_{30}$ chain length | | | |
| $C_{12}$-$C_{15}$ linear primary alcohols | | | |
| $C_{12}$-$C_{13}$ linear primary alcohols | | | |
| Decyl alcohol | | | |
| Hexadecyl alcohol (cetylic alcohol) | | | |

Table – Continued

| Solvents | Distillation range, °C. | Flash point, COC, °C. | Sp. gr., 25°/15.5° C. |
| --- | --- | --- | --- |
| Chlorinated diphenyls: | | | |
| "Arochlor" 1221 | 275-320 | 141-150 | 1.182-1.192 |
| "Arochlor" 1232 | 290-325 | 152-154 | 1.270-1.280 |
| "Arochlor" 1242 | 325-366 | 176-180 | 1.381-1.392 |
| "Arochlor" 1248 | 340-357 | 193-196 | 1.405-1.415 |
| "Arochlor" 1254 | 365-390 | None | 1.495-1.505 |
| Non-benzenoid hydrocargons and hydroxy derivatives: | | | |
| Alpha- and/or beta-terpineol | | | |
| Terpinolene | | | |

Any of the foregoing liquids, and any compatible mixtures thereof, can be used as the dispersed-phase liquid of my liquid remover composition. Preferably, the composition is prepared by the use of the systems shown in the drawings. The dispersed phase liquid is contained within a vessel such as the vessel 16 or 25. Water introduced under pressure into the injector 14 or 23 serves to draw the dispersed-phase liquid into the injector for admixture and proportioning thereof in a finely divided state for spraying through the airless hydro-type spray gun 17 or the air-hydro-type gun 27. The proportions of the dispersed-phase liquid and the continuous-phase water are controlled and maintained within the ranges hereinbefore given depending upon whether the system is operated on an expendable or recirculative basis.

Where, for use on an expendable basis, the concentration is above about 2 percent, the liquid remover composition should be thoroughly and violently agitated right up to the point of use of the liquid remover composition on the workpiece so that the solvent-miscible but water-immiscible liquid phase will be thoroughly and uniformly dispersed up to the time of its application to the workpiece.

Alternatively, the liquid remover composition can be prepared in an agitated tank, either mechanically or air-agitated, and the penetrant-coated workpiece dipped in the tank and the penetrant removed as a result of the vigorous turbulence of the remover composition against and over the surface carrying the excess penetrant thereon.

It will be understood that modifications and variations may be effected without departing from the scope of the novel concepts of the present invention.

I claim:

1. In a penetrant inspection method that includes the application to the surface of a workpiece of a liquid oily-type penetrant to cause the penetrant to be entrapped in any surface discontinuities and the subsequent removal of any film of excess penetrant from the surface without removing entrapped penetrant, the improvement which comprises applying to the penetrant-filmed surface a two-phase liquid remover free from any emulsifier and consisting essentially of water as the continuous phase and a water-immiscible liquid suspended therein in finely divided form as the dispersed phase, said dispersed phase constituting as a minimum about 0.2 percent of said two-phase liquid remover by weight, the liquid of said dispersed phase being miscible with said liquid penetrant, and said application of said liquid remover being sufficiently vigorous to cause said liquid remover to effect the displacement and removal of said penetrant film from said surface.

2. The method as defined in claim 1 in which said dispersed-phase liquid is a liquid hydrocarbon.

3. The method as defined in claim 2 in which said dispersed-phase liquid is kerosene.

4. The method as defined in claim 1, in which said dispersed phase is an alkyl phosphate ester.

5. The method as defined in claim 4, in which said dispersed phase is tributyl phosphate.

6. The method as defined in claim 1, in which said dispersed phase is a liquid plasticizer.

7. The method as defined in claim 6, in which said dispersed phase is di-octyl phthalate.

8. The method as defined in claim 1 in which said application of said liquid vehicle is carried out by spraying said liquid remover so forcibly against said penetrant film as to remove said film and leave said surface clean without the need for subsequent washing of said surface with water alone.

9. The method as defined in claim 1, in which said dispersed phase liquid is a hydrophobic liquid of substantially different density from that of water, the removed penetrant and sprayed liquid remover are collected and are allowed to stand quiescent until stratification into two layers takes place one of which is the liquid of said dispersed phase and penetrant and the other layer is water and said layers are separated for disposal.

10. The method as defined in claim 1, in which said dispersed phase constitutes between about 0.2 and 10 percent by weight of said liquid remover, and said liquid vehicle is applied to the penetrant-filmed surface with sufficient turbulence to cause said dispersed-phase liquid to mix with said penetrant and remove said penetrant from said surface.

11. The method as defined in claim 1 in which said dispersed phase constitutes from about 0.2 to 5 percent by weight of said liquid remover of a liquid hydrocarbon more volatile than water, and vigorously spraying said liquid remover directly against said surface to effect a turbulent mixing of said remover with said penetrant film and the removal of said film from said surface.

12. In a penetrant inspection method including the application of a substantially water-immiscible liquid penetrant to the surface of a workpiece, the removal of excess penetrant and the inspection of said surface for penetrant entrapped in any surface discontinuities, the improvement which comprises forming a two-phase liquid remover free from any emulsifier and consisting essentially of water as a continuous phase and a water-immiscible but penetrant-miscible liquid as the dispersed phase, said dispersed phase liquid being present as a very fine dispersion in an amount equal to a minimum of about 0.2 percent by weight of said two-phase remover and having a density substantially different from water, applying said liquid remover against said surface to effect a turbulent mixing of said remover with excess penetrant on said surface and the removal of said penetrant therefrom, collecting the removed penetrant and liquid remover admixed therewith in a common body, and separating from said body two components of different density, one being largely water alone and the other being largely a mixture of said liquid penetrant and said dispersed-phase liquid of said remover.

13. A liquid remover composition for removing a substantially water-immiscible liquid penetrant from a surface undergoing inspection, said composition being free from any emulsifier and consisting essentially of a two-phase liquid in which the continuous phase is water and the dispersed phase is a liquid substantially immiscible with water but miscible with said liquid penetrant and present in an amount equal to a minimum of about 0.2 percent by weight of said two-phase liquid.

14. A composition as defined by claim 13, wherein
said dispersed phase is a liquid hydrocarbon and is present within the range of about 0.2 percent to 10 percent by weight of said two-phase liquid,
said two-phase liquid being clear and relatively stable.

15. A composition as defined by claim 13, wherein
said dispersed phase is kerosene and is present within the range of about 0.2 percent to 10 percent by weight of said two-phase liquid,
said two-phase liquid being clear and relatively stable.

16. A composition as defined by claim 13, wherein
said dispersed phase is an alkyl phosphate ester within the range of from about 0.2 percent to 20 percent by weight of said two-phase liquid.

17. A composition as defined by claim 13, wherein
said dispersed phase is tributylphosphate and is present within the range of about 0.2 percent to 10 percent by weight of said two-phase liquid,
said two-phase liquid being clear and relatively stable.

18. A composition as defined by claim 13, wherein
said dispersed phase is a liquid plasticizer and is present within the range of about 0.2 percent to 10 percent by weight of said two-phase liquid,
said two-phase liquid being clear and relatively stable.

19. A composition as defined by claim 13, wherein
said dispersed phase is of substantially different density than water and is present within the range of between about 0.2 percent and 5 percent by weight of said two-phase liquid.

UNITED STATES PATENT OFFICE
CERTIFICATE OF CORRECTION

Patent No. 3,607,784      Dated September 21, 1971

Inventor(s) Adolf Mlot-Fijalkowski

It is certified that error appears in the above-identified patent and that said Letters Patent are hereby corrected as shown below:

Column 1, line 17, change "block" to --black--;

Columns 3 and 4, in the table of solvents, under "Hydrocarbons", insert --Kerosene-- in the blank space above "Hexane"; in the same table, under the heading "Liquid alcohols", second line below, correct the spelling of --linear--;

Columns 5 and 6, under the heading "Chlorinated diphenyls", the distillation range in °C. for Arochlor 1248, should be --340-375-- instead of "340-357"; in the same chart, correct the spelling of --hydrocarbons--.

Signed and sealed this 11th day of July 1972.

(SEAL)
Attest:

EDWARD M. FLETCHER, JR.
Attesting Officer

ROBERT GOTTSCHALK
Commissioner of Patents